United States Patent [19]

Gartside, III et al.

[11] Patent Number: 4,836,640
[45] Date of Patent: Jun. 6, 1989

[54] DEPRESSED CLADDING OPTICAL FIBER CABLE

[75] Inventors: Charles H. Gartside, III, Gwinnett County; Paul F. Glodis, Fulton County; Parbhubhai D. Patel, DeKalb County, all of Ga.

[73] Assignee: American Telephone and Telegraph Company, AT&T Bell Laboratories, Murray Hill, N.J.

[21] Appl. No.: 879,703

[22] Filed: Jun. 27, 1986

[51] Int. Cl.[4] .............................................. G02B 6/44
[52] U.S. Cl. ................................................ 350/96.23
[58] Field of Search ............... 350/96.23, 96.29, 96.30, 350/96.31, 96.33

[56] References Cited

U.S. PATENT DOCUMENTS

| | | | |
|---|---|---|---|
| 3,207,836 | 9/1965 | Slechta | 174/41 |
| 4,078,853 | 3/1978 | Kempf | 350/96.23 |
| 4,153,332 | 5/1979 | Longoni | 350/96.23 |
| 4,172,106 | 10/1979 | Lewis | 350/96.23 |
| 4,176,240 | 11/1979 | Sabia | 174/23 C |
| 4,199,224 | 4/1980 | Oestreich | 350/96.23 |
| 4,199,225 | 4/1980 | Slaughter | 350/96.23 |
| 4,212,097 | 7/1980 | Portinari | 350/96.23 X |
| 4,230,395 | 10/1980 | Dean et al. | 350/96.23 |
| 4,235,511 | 11/1985 | Yonechi | 350/96.23 |
| 4,239,335 | 12/1980 | Stiles | 350/96.23 |
| 4,239,336 | 12/1980 | Parfree et al. | 350/96.23 |
| 4,241,979 | 12/1980 | Gagen et al. | 350/96.23 |
| 4,272,155 | 6/1981 | Slaughter | 350/96.23 |
| 4,333,706 | 6/1982 | Davis | 350/96.23 |
| 4,341,440 | 7/1982 | Trezeguet | 350/96.23 |
| 4,342,500 | 8/1982 | Oestreich et al. | 350/96.23 |
| 4,349,243 | 9/1982 | Amano et al. | 350/96.23 |
| 4,435,040 | 3/1984 | Cohen et al. | 350/96.3 X |
| 4,439,007 | 3/1984 | Lazay et al. | 350/96.30 |
| 4,446,686 | 5/1984 | Panuska | 56/6 |
| 4,450,676 | 5/1984 | Sakamoto | 57/6 |
| 4,557,560 | 12/1985 | Bohannon, Jr. et al. | 350/96.23 |
| 4,730,894 | 3/1988 | Arroyo | 350/96.23 |

FOREIGN PATENT DOCUMENTS

51-69643 6/1976 Japan.
1438074 6/1976 United Kingdom.

Primary Examiner—John D. Lee
Assistant Examiner—John Ngo
Attorney, Agent, or Firm—Edward W. Somers

[57] ABSTRACT

An optical fiber cable (20) includes a core (21) comprising plurality of units (22—22). Each unit is formed by a plurality of optical fibers (24—24) which are assembled together without intended stranding. Each of the optical fibers includes a core, and inner and outer claddings with the inner cladding characterized by an index of refraction depressed from that of the outer cladding. The ratio of the inner cladding diameter to the core diameter and the ratio of the difference in the indices of refraction of the inner and outer claddings to the difference in indices of refraction between the core and the inner cladding are such that each optical fiber is capable of operation in a single mode fashion at a predetermined wavelength. Also, the difference between the indices of refraction of the core and the inner cladding is sufficiently high to cause each fiber to be substantially insensitive to microbending. The plurality of units are enclosed in a common tube (34) which provides a predetermined packing density. In one embodiment, a waterblocking material (46) is disposed within the tube to fill the interstices between the optical fibers and between the units. The waterblocking material is such that its critical yield stress does not exceed about 70 Pa at 20° C. and such that it has a shear modulus of less than about 13 KPa at 20° C. The common tube is enclosed with a sheath system. This arrangement is such that the optical performance of the cable is not degraded at temperatures as low as −40° F.

16 Claims, 4 Drawing Sheets

DEPRESSED CLADDING OPTICAL FIBER CABLE

TECHNICAL FIELD

This invention relates to a depressed cladding optical fiber cable. More particularly, it relates to an optical fiber cable which includes a plurality of units each comprising a plurality of optical fibers with each of the optical fibers having an inner cladding which has an index of refraction that is less than that of an outer cladding. The plurality of units is disposed in a common tube enclosed in a sheath system.

BACKGROUND OF THE INVENTION

Developments in the optical fiber communications field have been rapid. However, the technology still is undergoing major shifts in direction. For example, earlier generation fiber systems were designed to operate at wavelengths of about 0.8 $\mu$m, and current systems operate at 1.3 $\mu$m. Now there is growing interest in systems having an operating wavelength of about 155 $\mu$m to take advantage of the loss window that exists in silica-based optical fiber in that wavelength region. Another example of a major shift which is driven by demand for higher bandwidths is that from multimode to single mode fibers.

Although desired for their large bandwidth capabilities and small size, light-transmitting optical fibers are mechanically fragile, exhibiting brittle fracture under tensile loading and degraded light transmission when the fiber is bent. A cable for use in a duct must be capable of withstanding tensile loads applied when the cable is pulled into the duct and stresses caused by bends which may be frequent in loop plant in urban areas. As a result, cable structures have been developed to protect mechanically the optical fibers.

Cable structures which have been developed for optical fibers include loose tube, ribbon and stranded cables. For a description of loose tube cables, see, for example, D. Lawrence and P. Bark 'Recent Developments in Mini-Unit Cable' published at pp. 301–307 of the Proceedings of the 32nd International Wire and Cable Symposium, 1983. See also U.S. Pat. No. 4,153,332. Ribbon cable comprises a core of one or more ribbons with each including a plurality of optical fibers disposed generally in a planar array. The core is surrounded by a loose-fitting plastic inner tubular jacket and an outer jacket reinforced with strength members. Another optical communications cable which is suitable for use in duct systems is disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of strength members, which are wrapped helically in opposite directions. Under a sustained tensile load, these two layers of strength members produce equal but oppositely directed torques about the cable to insure the absence of twisting. In another type of optical communications cable, a plurality of optical fibers are enclosed in an extruded plastic tube to form a unit and a plurality of these tubed units are enclosed in a common extruded plastic tube which is enclosed in a sheath system. The optical fibers which are enclosed in each unit tube are stranded together about a central strength member.

Generally, optical fiber cables of the prior art, such as ribbon and stranded and loose tube, suffer from the disadvantage of having the ribbons, the stranded units or the tubes manufactured on a separate line. In stranded cable, for example, a plurality of units which priorly have been enclosed individually in tubes and stranded are fed into a line which applied the common tube and the outer jacket. Each of the units must be made separately on another line and inventoried until a plurality of them can be associated together in the common tube. Because the ribbon or tubed core is generally stranded with a predetermined lay, its manufacture and the assembly of the ribbons or tubes into the core involve the use of relatively heavy rotating apparatus which may be undesirable from a manufacturing standpoint.

Also, in an optical fiber cable, perturbations along the axes of the optical fibers, which are referred to as microbends, can cause optical loss by allowing power to escape through the cladding. The degradation in transmission which results from this type of bending is known as microbending loss. For a discussion of microbending loss, see S. E. Miller et al, *Optical Fiber Telecommunications*, Academic Press, New York, (1979) pp. 158–161; H. G. Unger, *Planar Optical Waveguides and Fibers*, Clarendon Press, Oxford, Chapter 6, pp. 552–648; and D. Marcuse 'Microdeformation Losses of Single Mode Fiber', *Applied Optics*, vol. 23 no. 7, Apr. 1, 1984, pp. 1082–1091. This problem may occur, for example, when a waterblocking filling material is introduced into the cable in order to prevent the incursion of water. Typically, waterblocking materials of the prior art do not yield under strains experienced when the cable is made or handled. This prevents the movement of the optical fibers within the cable and the fibers buckle because they contact, with a relatively small periodicity, a surface of the unyielding filling material. This is overcome somewhat by stranding the fibers which allows the fibers under stress to form new helices to avoid microbending losses. However, as is well known, stranding requires the use of a lower line speed.

These problems have been addressed by an optical fiber cable which is disclosed in application Ser. No. 721,533 which was filed on Apr. 10, 1985 in the names of C. H. Gartside III, A. D. Panusska, and P. D. Patel (now abandoned). It includes a plurality of optical fibers which are assembled together into units without intended stranding. All the units are disposed in a common plastic tube instead of having each unit disposed within an associated individual tube. The common tube may be filled with a grease-like composition having a relatively low critical yield stress as disclosed in application Ser. No. 697,054 filed on Jan. 31, 1985 in the names of C. H. Gartside, III et al (now U.S. Pat. No. 4,701,016).

With sophisticated methods of manufacture for this last-described cable and with the fibers being enclosed in coatings, these microbending losses are not discernible at room temperature. The coatings absorb perturbations at room temperature, allowing the fiber to remain substantially unperturbed. However, at relatively low temperatures, that is in the range of −40° F., the coating material experiences thermal changes thereby causing the optical fiber axes in the cable to bend. Because of the properties of the coating material and of the cable, the coating material may only partially absorb these perturbations and some are transferred through to the optical fibers.

While the aforementioned cable has overcome many problems, improvement in the consistency of its performance at relatively low temperatures has been desired. At relatively low temperatures in the range of about −40° F., the performance of cables made in accordance with the abovedescribed invention should be substantially microbending insensitive. What is needed is an optical fiber cable which is compact and which inhibits the introduction of undue streses that could lead to microbending losses in the optical fibers over commonly accepted temperature ranges.

SUMMARY OF THE INVENTION

The foregoing problems have been overcome by the optical fiber cable of this invention. An optical fiber cable of this invention includes a plurality of optical fibers which are assembled together without intended stranding to form a unit which extends in a direction along the longitudinal axis of the cable. A length of tubing which is made of a plastic material encloses the plurality of optical fibers and is parallel to the longitudinal axis of the cable. Each of the optical fibers includes a core, an inner cladding and outer cladding. The inner cladding has an index of refraction which is less than that of the outer cladding. The overall refractive index difference of each of the optical fibers, that is the difference between the indices of the core and the inner cladding, is sufficiently high so that each optical fiber is substantially insensitive to microbending. Also, the ratio of the inner cladding diameter to the core diameter and the ratio of the difference in the indices of refraction of the inner and outer claddings to the difference in the refractive indices of the inner cladding and the core are such that each optical fiber is capable of operation in a single mode fashion at a predetermined wavelength. Further, the ratio of the cross-sectional area of the plurality of optical fibers to the cross-sectional area within the tubing does not exceed a predetermined value which in a preferred embodiment in which the optical fibers are coated is about 0.5.

The cable also includes at least one strength member and a jacket which is made of a plastic material and which encloses the length of tubing. In one embodiment, a waterblocking material which is disposed within the tubing and which fills substantially the interstices between the fibers has a critical yield stress which is not greater than about 70 Pa at 20° C. Each unit, if the cable includes a plurality of units, is separated from the other units only by the waterblocking material and the plurality of units are enclosed in a common length of tubing instead of in individual tubes as in the prior art.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
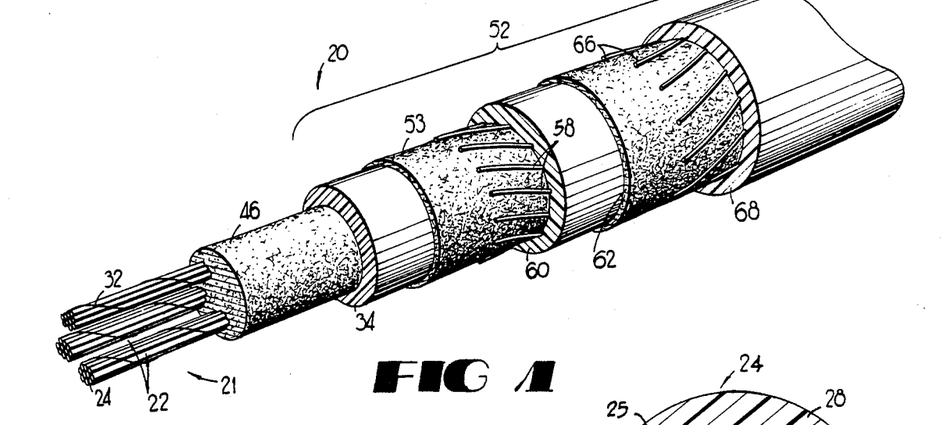
FIG. 1 is a perspective view of an optical fiber cable of this invention.
Figure 2:
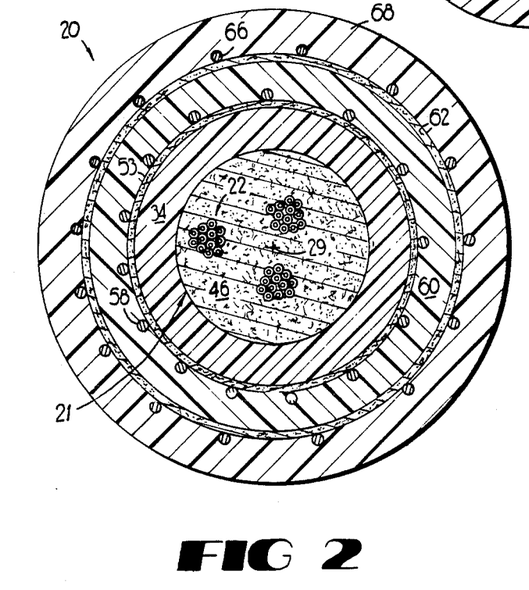
FIG. 2 is an end view of the cable of FIG. 1.
Figure 3:
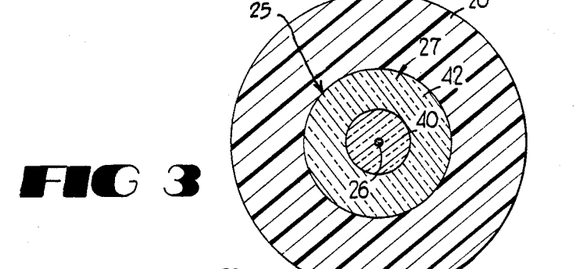
FIG. 3 is an end view of a coated optical fiber.

Referring now to FIGS. 1 and 2, there is shown a preferred embmodiment of a cable 20 of this invention. It includes a core 21 comprising a plurality of units each of which is designated generally by the numeral 22 and includes a plurality of individual coated optical fibers 24—24. Further, each of the coated optical fibers 24—24 includes a fiber 25, which comprises a core 26 and cladding designated generally by the numeral 27, and one or more coatings 28—28 (see FIG. 3). It should be understood that herein the term optical fiber refers to the fiber itself and any coating applied thereto. Typically, for a single mode optical fiber, the core 26 has a diameter in the range of 8–9 μm and an outer cladding diameter of about 125 μm. Each of the units 22—22 either is stranded or non-stranded, that is the unit extends generally parallel to a longitudinal axis 29 of the cable, or is formed with an oscillating lay.

It should be understood that the optical fibers 24—24 which are included in each of the units 22—22 of the preferred embodiment are assembled without being stranded together and furthermore that the unit itself is assembled with an infinite lay length. The optical fibers may be undulated along portions of the unit which will cause each of the optcial fibers to have a length which is at least slightly greater than the length of any enclosing sheath system. This will prevent undue strain from being imparted to the optical fibers 24—24 during manufacture, installation and service of the cable.

As is further seen in FIGS. 1 and 2, the core 21 comprises a plurality of units which are individually bound by a binder 32 and which are enclosed in a tube 34. The tube 34 which is made of a plastic material such as polyvinyl chloride or polyethylene, for example, contains the individually untubed, bound units and extends generally parallel to the longitudinal axis 29 of the cable 20.

An important characteristic of the cable of this invention is its packing density. Packing density is defined as the ratio between the cross-sectional area of the optical fibers and any coatings thereon to the total cross-sectional area enclosed by the tube 34. If the packing density is too high, optical fibers within the core may experience relatively high stress and could break during handling of the cable. This occurs when the packing density is too high because as with the use of waterblocking materials which yield at a relatively high stress, the optical fibers cannot move sufficiently within the tube to relieve stresses such as would occur in bending. In a preferred embodiment, the packing density does not exceed a value of about 0.5.

Figure 4A:
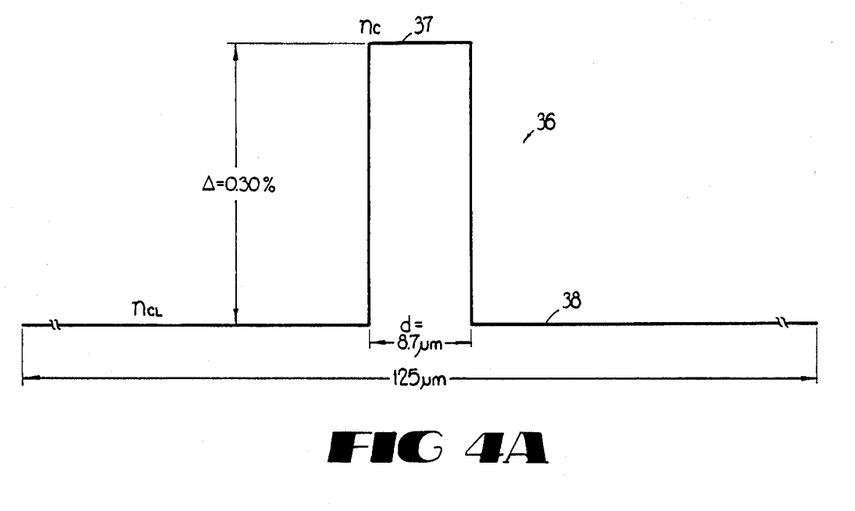
FIGS. 4A and 4B are profile representations of the refractive index configuration of a matched cladding optical fiber and of a preferred embodiment depressed cladding fiber of the cable of this invention, respectively.

As mentioned hereinbefore, small perturbations in the axis of an optical fiber which are referred to as microbends can cause optical loss by allowing power to escape through the cladding. The degree of confinement of the optical power and thus the susceptibility to microbending - induced optical loss can be characterized by the spot size, also referred to as the male field diameter, and the effective index of the fundamental propagating mode. These well known parameters as well as others used hereinafter are defined, for example, in the hereinbefore-identified Miller, Unger and Marcuse publications, each of which is incorporated by reference hereinto. Critical parameters which affect microbending loss are the diameter, d, of the core and the difference in the indices of refraction, $n_C$ and $n_{CL}$, of the core and the cladding, respectively. This difference generally is expressed as a percentage difference and is designated $\Delta$. See for example, a representation 36 of the index of refraction profile of a typical single mode optical fiber as shown in FIG. 4A. An optical fiber having an index of refraction profile as shown in FIG. 4A is referred to as a matched cladding optical fiber. There, the core has a diameter, d, and an index of refraction $n_C$ designated by the numeral 37 and the cladding has an index of refraction $n_{CL}$ designated by the numeral 38 which is uniform throughout the cladding. A typical matched cladding optical fiber has a $\Delta$ of 0.30%. These parameters, d and $\Delta$, determine, at a given wavelength, the spot size and the effective index. A small spot size and high effective index assure tight confinement of the optical power to the region of the fiber core and thus high resistance to microbending induced loss.

Although improved microbending performance can be obtained by increasing $\Delta$ and decreasing d, leading to a reduced spot size, it is known that the difficulty of achieving low fiber splice loss increases as the spot size decreases. Further, the wavelength of zero dispersion increases as the core diameter decreases. As the zero dispersion wavelength moves above the operating wavelength, the fiber dispersion increases and the maximum bandwidth at the operating wavelength decreases. These adverse effects, increasing fiber splice loss and increasing fiber dispersion, limit the minimum fiber core size for optimal operation at 1.3 $\mu$m.

The dependence of the spot size and zero dispersion wavelength on $\Delta$ is less pronounced. For example, an optical fiber having a relatively high $\Delta$ may be used to provide microbending resistance, while maintaining a spot size which is suitable for low loss splicing. However, increasing $\Delta$ to improve the microbending performance will increase the cutoff wavelength of the fiber. As is well known, the cutoff wavelength is that wavelength below which higher order modes may be propagated. Inasmuch as the bandwidth of the fiber is drastically reduced if higher order modes are present, any increase in cutoff wavelength must be controlled to preserve single mode operation at the system wavelength.

Figure 4B:
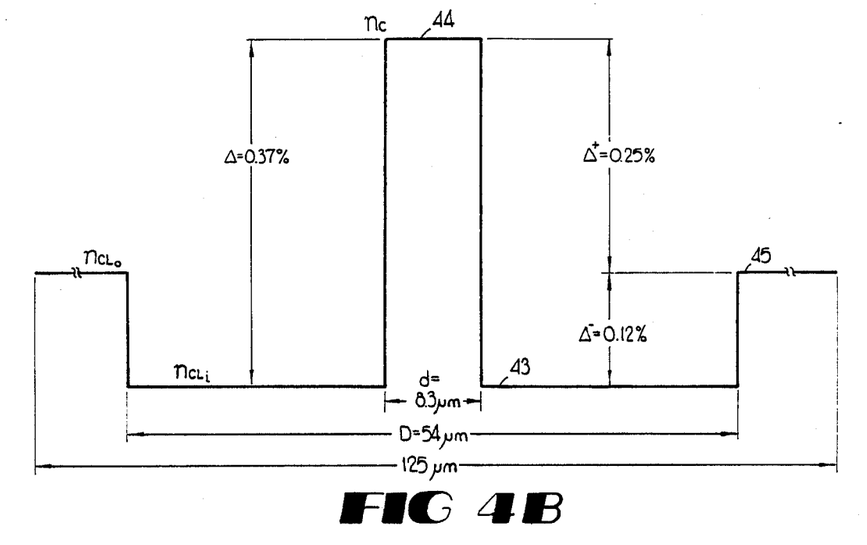

This problem is overcome by causing the optical fibers 24—24 which are used to provide the units 22—22 to be characterized by an inner cladding 40 (see FIG. 3) having an index of refraction which is depressed relative to that of an outer cladding 42. Such a fiber is said to have a depressed inner cladding. It has been found that a depressed cladding optical fiber is advantageous in that such a fiber can be designed with a relatively high resistance to optical loss which is induced by microbending. As shown in FIG. 4B, the core 26 has a diameter, d, and an index of refraction 44 which has a relative refractive index difference $\Delta^+$ with respect to a reference line 45 corresponding to the index of refraction $n_{CLo}$ of the outer cladding 42. The inner cladding 40 has a diameter, D, and an index of refraction $n_{CLi}$ which is designated by the numeral 43 and which has a relatively refractive index difference $\Delta^-$ with respect to the same reference line 45. The overall difference in index of refraction from that of the core to that of the inner cladding is designated $\Delta$.

An advantage of a depressed cladding optical fiber is that the cutoff wavelength, in addition to its dependence on the core diameter, d, and overall refractive index difference $\Delta$, depends on the ratio of the inner cladding diameter to the core diameter, D/d, and the ratio of the inner cladding index depression to the total index difference, $\Delta^-/\Delta$. For example, as D/d decreases, the cutoff wavelength decreases. A nominal value of D/d is 6.5, but a useful range may include values as low as about 3. Because the spot size, effective index and zero dispersion wavelength are insensitive to these ratios in the contemplated range thereof, the higher values of $\Delta$ desired for the improved microbending performance can be offset by choosing appropriate values of D/d and $\Delta^-/\Delta$ to control the cutoff wavelength. Typical values of D/d and $\Delta^-/\Delta$ result in a lowering of the cutoff wavelength by 100 nm or more and therefore single mode operation is achieved in a relatively high $\Delta$ microbending loss resistant fiber.

What is needed is a $\Delta^-/\Delta$ and D/d which are appropriate to provide a cutoff wavelength which is substantially reduced from that of a matched cladding fiber with the same core size and overall refractive index difference. What is provided is an optical fiber having parameters which have been chosen in such a way that a substantially microbending insensitive fiber is capable of operation in single mode fashion at a predetermined wavelength. The cable of this invention facilitates operation at a relatively high total index of refraction difference $\Delta$. This allows single mode operation which normally could not be achieved at a wavelength of 1.3 $\mu$m, for example, and assures high resistance to microbending induced loss even if the system is operated at a higher wavelength of 155 $\mu$m, for example. In a preferred embodiment, the predetermined wavelength of single mode operation is 1.3 $\mu$m with the additional capability of low loss operation at 1.55 $\mu$m.

The cable of this invention includes low dispersion, low loss fibers having a $\Delta$, a core diameter, D/d and $\Delta^-/\Delta$ which provide cutoff at sufficiently low wavelengths to guarantee single mode operation at 1.3 $\mu$m. A fiber having an up-doped core with a down-doped cladding can provide a high $\Delta$ and low material dispersion in the vicinity of 1.3 $\mu$m. As set forth in U.S. Pat. No. 4,439,007 which issued on Mar. 27, 1984 in the names P. D. Lazay et al and which is incorporated by reference hereinto, a relatively high $\Delta$ does not necessarily result in high material dispersion in the vicinity of 1.3 $\mu$m when reliance is had on a down-doped cladding. Sufficiently low cutoff wavelengths, low dispersion and a spot size suitable for low loss splicing are obtained by the appropriate choise of d, D/d and $\Delta^-/\Delta$ with a relatively high $\Delta$ which results in low packaging loss. Typical values of $\Delta^-$ range between 10 and 40% of $\Delta$. In a preferred embodiment, d=8.3 $\mu$m, D=54 $\mu$m, $\Delta^+=0.25\%$, $\Delta^-=0.12\%$ and $\Delta=0.37\%$.

In the embodiment shown in FIGS. 1 and 2, the units 22—22 and the core between the units and the tube 34 are filled with a suitable waterblocking material 46. It has been determined that in an optical fiber cable, a filling composition must also function to maintain the optical fibers in a relatively low state of stress. Such a material is a colloidal particle-filled grease composition disclosed in priorly disclosed application Ser. No.

697,054 which was filed January 31, 1985, (now U.S. Pat. No. 4,701,016) and which is incorporated by reference hereinto.

A cable filling or waterproofing material, especially an optical fiber cable filling compound, should meet a variety of requirements. Among them is the requirement that the physical properties of the cable remain within acceptable limits over a rather wide temperature range, e.g. from about −40° to about 76° C. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. Typically, microbending loss is more difficult to control at long wavelengths than at short ones. Thus, it is important to be able to produce optical fiber cable that has no significant cabling-induced losses at long wavelengths such as, for example, 1.55 $\mu$m.

The preferred waterblocking material is a composition which comprises two major constituents, namely oil, and a gelling agent such as colloidal particles, and, optionally, a bleed inhibitor as a third major constituent. Other constituents such as a thermal oxidative stabilizer, for example, are optional.

Among the oils useful in the waterblocking material are polybutene oils having a minimum specific gravity of about 0.83 and a maximum pour point, as per ASTM D97, of less than about 18° C., or ASTM type 103, 104A, or 104B, or mixtures thereof, per ASTM D-226 test, of naphthenic or paraffinic oils having a minimum specific gravity of about 0.86, and a maximum pour point, per ASTM D97, of less than about −4° C. Specific examples of oils useful in the cable of the invention are a polybutene oil, which is a synthetic hydrocarbon oil having a pour point per ASTM D97 of −35° C., an SUS viscosity of 1005 at 99° C., a specific gravity of 0.8509, and an average molecular weight of 460. It is available from the Amoco Chemical Corporation, Texas City, Texas, under the trade designation L-100. Another example oil is a white mineral oil, having a pour point per ASTM D97 of −25° C., an SUS viscosity of 53.7 at 99° C., an average specific gravity of 0.884, and maximum aromatic oils 1% by weight (b.w.). The latter is available from Penreco of Butler, Pennsylvania, under the designation Drakeol 35. Other oils include triglyceride-based vegetable oils such as castor oil and other synthetic hydrocarbon oils such as polypropylene oils. For applications requiring fire-retardant properties, chlorinated paraffin oils having a chlorine content of about 30–75% b.w. and a viscosity at 25° C. of between 100 and 10,000 cps are useful. An example of such oil is Paroil 152, which is available from the Dover Chemical Company of Dover, Oh. Polymerized esters of acrylic acid or similar materials are useful as pour-point depressants at addition levels below 5% b.w. An example is ECA 7955, available from the Exxon Chemical Company.

Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior is often referred to as thixotropic.

Colloidal fillers useful in the cable of the invention include colloidal silica, either hydrophilic or hydrophobic, preferably a hydrophobic fumed silica having a BET surface area between about 50 and about 400 m$^2$/gm. An example of a hydrophobic fumed silica is a polydimethylsiloxane-coated fumed silica having a BET surface area of about 80–120 m$^2$/gm, containing about 5% b.w. carbon, and being available from the Cabot Corporation of Tuscola, Illinois under the trade designation Cab-O-Sil N70-TS. An exemplary hydrophilic colloidal material is fumed silica with a BET surface area of about 175–225 m$^2$gm, nominal particle size of 0.012 $\mu$m, and a specific gravity of 2.2, available from the Cabot Corporation under the designation Cab-O-Sil M-5. Other colloidal fillers useful in the practice of the invention are precipitated silicas and clays such as bentonites, with or without surface treatment.

Oil-retention of the inventive greases may be improved by the addition of one or more bleed inhibitors to the composition. The bleed inhibitor can be a rubber block copolymer, a relatively high viscosity semiliquid, sometimes referred to as semisolid, rubber, or other appropriate rubber. Block copolymers and semiliquid rubbers will be referred to collectively as rubber polymers. Incorporating a rubber polymer into the grease composition allows a reduction in the amount of colloidal particles that must be added to the mixture to prevent syneresis of the gel. This reduction can result in cost savings. Furthermore, it makes possible the formulation of nonbleeding compositions having a relatively low critical yield stress.

Among the rubber block copolymers that can be used in waterblocking compositions for the cable of the invention are styrene-rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution to about 2000 cps in a 15% b.w. rubber solution. Exemplary block rubbers are (a) a styrene-ethylene propylene block copolymer (SEP), unplasticized, having a styrene/rubber ratio of about 0.59, a specific gravity of about 0.93, a break strength per ASTM D-412 of 300 psi, and being available from the Shell Chemical Company of Houston, Texas, under the trade designation Kraton G1701; (b) a styrene-ethylene butylene block copolymer (SEB), having a styrene/rubber ratio about 0.41, and haing available from the Shell Chemical Company under the designation TRW-7-1511; and (c) a styrene-ethylene butylene-styrene block copolymer (SEBS), unplasticized, and having a styrene/rubber ration of about 0.16, a specific gravity of about 0.90, 750% elongation, 300% modulus per ASTM D-412 of 350 psi, and being available from the Shell Chemical Corporation under the trade designation Kraton G1657. Other styrene-rubber or styrene-rubber-styrene block copolymers are styrene-isoprene rubber (SI) and styrene-isoprene-styrene (SIS) rubber, styrene-butadiene (SB) and styrene-butadiene-styrene (SBS) rubber. An example of SIS is Kraton D1107, and an example of SBS is Kraton D1102, both available from the Shell Chemical Company.

Among the semiliquid rubbers found useful in the practice of the invention are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, and available from the Exxon Chemical Company of Houston, Texas under the trade designation Vistanex LM-MS. Other rubbers which are considered to be useful are butyl rubber, ethylene-propylene rubber (EPR), ethylene-propylene dimer rubber (EPDM), and chlorinated butyl rubber having a Mooney viscosity ML 1+8 at 100° C. per ASTM D-1646 of between about 20 and 90. Examples of the above are Butyl 077, Vistalon 404, Vistalon 3708, and Chlorobutyl 1066, respectively, all available from the Exxon Chemical Company. Also useful are depolymerized rubbers having a viscosity of between about 40,000 and 400,000 cps at 38° C. An example thereof is DPR 75 available from Hardman, Inc. of Belleville, N.J.

The composition of the waterblocking material 46 is intended to block effectively entry of water into the core 21 while minimizing the added loss to the cable in order to provide excellent optical performance. Although the oil retention characteristic of the composition is a concern, the most important property is the optical performance of the cable 20.

Table I shows the effect of several different bleed inhibitors on oil separation, for two different oils, Drakeol 35 and L-100. The three block copolymer-containing compositions comprise 92% b.w. oil, 6% b.w. Cab-O-Sil N70-TS colloidal filler, and 2% b.w. inhibitor. The semiliquid rubber-containing compositions LM-MS comprise 6% b.w. N70-TS colloidal filler, the indicated amounts of the inhibitor, and 89 and 84% b.w. of Drakeol 35.

TABLE I

| Inhibitor | Oil Separation | |
|---|---|---|
| | Drakeol-35 % Separation | L-100 % Separation |
| 2% SEP | 2.5 | 0.7 |
| 2% SEB | 11 | 3.5 |
| 2% SEBS | 5 | 2 |
| 5% LM-MS | 7 | — |
| 10% LM-MS | 2 | — |

Table II shows data on oil separation for several compositions that do not include bleed inhibitors. It should be evident that the addition of a bleed inhibitor is more effective than increasing the colloidal particle content of the composition in preventing oil separation or drip. Also, increasing the results in increased critical yield stress. Thus to avoid syneresis altogether, the low values of critical yield stresses needed in some instances may be unobtainable without use of bleed inhibitors. The data of Table II was obtained with N70-TS colloidal filler and Drakeol 35 oil.

TABLE II

| Oil Separation | | | | |
|---|---|---|---|---|
| fumed silica (% b.w.) | 6 | 7 | 8 | 10 |
| oil separation (% b.w.) | 36 | 28 | 20 | 14 |

Figures 5, 9:
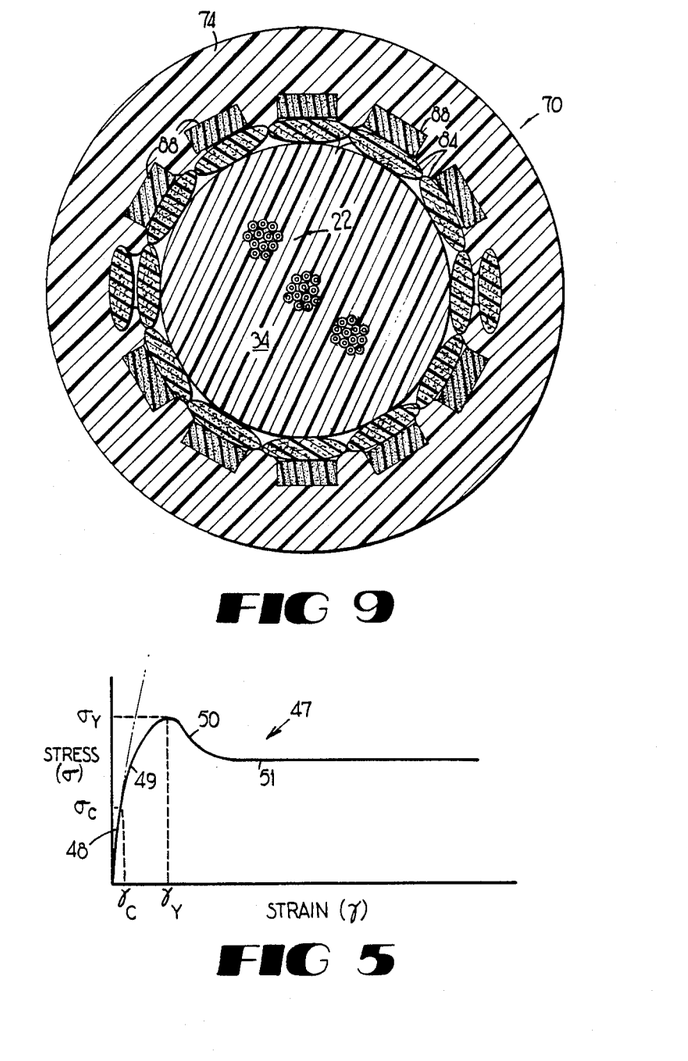
FIG. 5 is an exemplary curve of applied stress versus strain for a waterblocking material.
FIG. 9 is an end view of the cable of FIG. 8.

FIG. 5 shows a generalized stress-strain curve 47 at constant strain rate for a thixotropic material such as that used as the waterblocking material 46, and identifies several important parameters. In segment 48 of the stress-strain curve 47, the material acts essentially as an elastic solid. The segment extends from zero stress to the critical yield stress $\sigma c$. The strain corresponding to $\sigma c$ is identified as $\gamma c$, the critical shear strain. By definition, the coordinates $\sigma c$, $\gamma c$ indicate the onset of yielding and the quantity $\sigma c/\gamma c$ (or $\sigma/\gamma$ for $\sigma < \sigma$) is known as the shear modulus ($G_e$) of the material.

The prior art teaches that filling materials for optical fiber cable need to have low values of $G_e$. However, it has been determined that, at least for some applications, a low value of $G_e$ of the filling material is not sufficient to assure low cabling loss, and that a further parameter, the critical yield stress, $\sigma c$, also needs to be controlled. Typically, the critical yield stress of material according to the invention is not greater than about 70 Pa, measured at 20° C. whereas the shear modulus is less than about 13 kPa at 20° C.

A segment 49 of the stress-strain curve of FIG. 5 represents increasing values of incremental strain for increasing stress. The stress $\sigma$ is the maximum value of stress sustainable by the material at a given strain rate with $\gamma$ being the corresponding strain. For strains in excess of $\gamma y$, the stress at first decreases as shown by segment 50, becoming substantially independent of strain for still greater values of strain as shown by the segment 51. The waterblocking material thus exhibits a liquid like behavior for $\gamma > \gamma y$.

A filling composition for a filled cable 20 typically comprises between about 77 and about 95% b.w. oil. If a bleed inhibitor is present and the inhibitor is a rubber block copolymer, then the oil content typically is between about 90 and about 95% b.w. On the other hand, if the bleed inhibitor is a semiliquid rubber, then the oil content typically is between about 77 and about 91% b.w. The composition further comprises at most 15% b.w., preferably at most 10% b.w., of colloidal particles. If the colloidal particles are fumed silica, then a typical range is from 2 to about 10% b.w., with 5–8% b.w. being currently preferred for some applications. The bleed inhibitor content of the composition is typically between about 0.5 and 15%, with the currently preferred range for block copolymer rubbers being between about 0.5 and about 5% b.w., and for semiliquid rubbers being between about 3 and about 15% b.w. Optionally, the composition may also comprise minor amounts of an oxidative stabilizer and other additives. An exemplary stabilizer is tetrakis methane, available from Ciba-Geigy under the trade designation Irganox 1010. Typically the oil, colloidal particles, and, if used, a bleed inhibitor, account for about 99% b.w. or more of the total compositions.

Exemplary compositions that were studied are shown in Table III in parts by weight. The compositions were prepared by known methods, typically comprising blending oil, bleed inhibitor, antioxidant, and colloidal particle material first at ambient temperature and pressure, then at ambient temperature under a partial vacuum (typically less than about 300 Torr). Some compositions, e.g. E, were heated to about 150° C. while being stirred, and maintained at that temperature for about 4 hours. The resulting compositions were evaluated, including a determination of $\sigma_c$ and $G_e$ of some by cone-and-plate rheometry. An exemplary summary of the properties also is presented in Table III with all measurements of $\sigma_c$ and $G_e$ being at 20° C.

Of the example compositions disclosed in Table III, example A is preferred. The stress values designated (a) were determined without aging while those designated (b) were aged for the time indicated. Notwithstanding the use of bleed inhibitors in many of the examples of Table III, some may not pass the drip test. However, cables filled with any of the compositions of Table III meet the requirements for optical performance.

TABLE III

| Examples Constituents | Compositions (parts b.w.) | | | | | | | | | | | | |
|---|---|---|---|---|---|---|---|---|---|---|---|---|---|
| | A | B | C | D | E | F | G | H | I | J | K | L | M |
| Oil (Drakeol 35) | 93 | 97.5 | 92.5 | 92 | 92 | 95.5 | | | 92 | 92 | 88 | 83 | 91.5 |
| Oil (L-100) | | | | | | | 93 | 92 | | | | | |
| Colloidal Filler (N70-TS) | 7.0 | | 6.0 | 6.5 | 6.0 | | 7.0 | 6.0 | 6.0 | 6.0 | 7.0 | 7.0 | 7.0 |
| Colloidal Filler (M5) | | 2.5 | | | | 2.5 | | | | | | | |
| Bleed Inhibitor (Kraton G1701) | | | 1.5 | 1.5 | 2.0 | 2.0 | | 2.0 | | | | | 1.5 |
| Bleed Inhibitor (Kraton G1657) | | | | | | | | | 2.0 | | | | |
| Bleed Inhibitor (TRW-7-1511) | | | | | | | . | | | | 2.0 | | |
| Bleed Inhibitor (LM-MS) | | | | | | | | | | | | 5.0 | 10 |
| Stabilizer (Irganox 1010) | 0.2 | 0.2 | 0.2 | 0.2 | 0.2 | 0.2 | 0.2 | 0.2 | 0.2 | 0.2 | 0.2 | 0.2 | 0.2 |
| (a)$\sigma_c$ (Pa) | 10 | 9.4 | 7.2 | 8.1 | 6.6 | | 8.1 | | | | . | 3.6 | 15 |
| (a) $G_e$ (KPa) | 1.8 | .5 | 1.5 | 1.7 | 1.7 | | 1.7 | | | | | 2.0 | 2.6 |
| time (hrs) | 16 | | 16 | 16 | 16 | | 16 | | | | | 16 | 22 |
| (b)$\sigma_c$ (Pa) | 10 | | 13 | 14 | 15 | | 17 | | | | | 6.9 | 27 |
| (b) $G_e$ (KPa) | 1.8 | | 1.8 | 2.0 | 1.8 | | 2.2 | | | | | 1.8 | 3.0 |

The mechanical properties of the inventive composition are a function of the colloidal particle content. For example, it has been determined that $\sigma c$ as well as $G_e$ decreases with decreasing particulate content.

Advantageously, the waterblocking material 46 which is used to fill the core of a cable of this invention yields at a low enough stress so that the optical fibers 24—24 and units 22—22 are capable of moving within the core when the cable is loaded or bent. The yielding filling material allows the optical fibers to move within the tube 34 which reduces the stress therein and lengthens the life of the optical fibers.

As mentioned hereinbefore, the cable of this invention may be made with the units not being stranded together, as in the preferred embodiment, or stranded or with an oscillating lay. Of course, the nonstranded is preferred inasmuch as the stranding apparatus may be eliminated and line speed increased.

The tube 34 may be considered as one element of a sheath system 52 of the cable 20. Returning now to FIGS. 1 and 2, it is seen that over the tube 34 are disposed other elements of a sheath system comprising a bedding layer 53 and a group of reinforcing strength members 58—58, an intermediate jacket 60 of polyethylene, another bedding layer 62 and another group of strength members 66—66 and an outer jacket 68. Both jackets are made of polyethylene although other plastic materials may be used. Further, the materials for the jackets may differ. The strength members are steel wires in the preferred embodiment. However, it is apparent that other materials, metallic and non-metallic, may be used for those members.

Figure 6A:
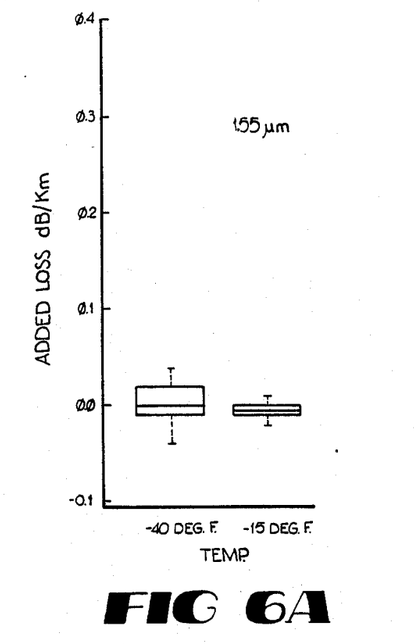
FIGS. 6A-6B are graphs which depict added losses associated with cables of this invention and of the prior art, respectively, at one operating wavelength.
Figure 6B:
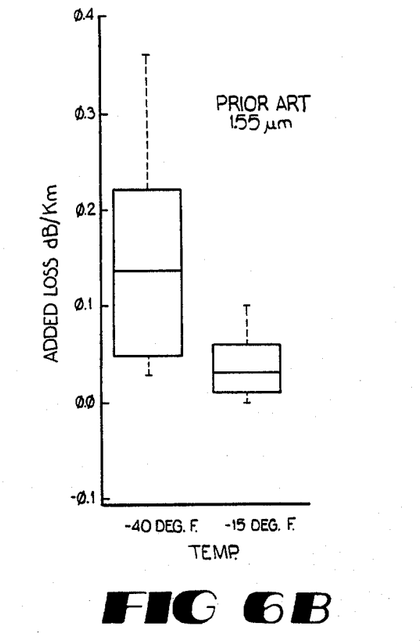
Figure 7A:
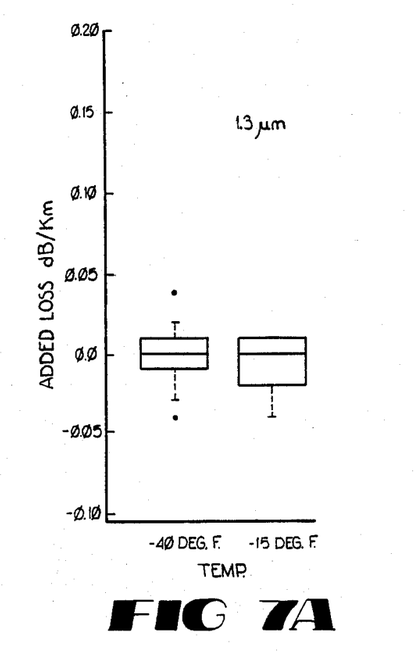
FIGS. 7A-7B are graphs which depict added losses associated with cables of this invention and of the prior art, respectively, at another operating wavelength.
Figure 7B:
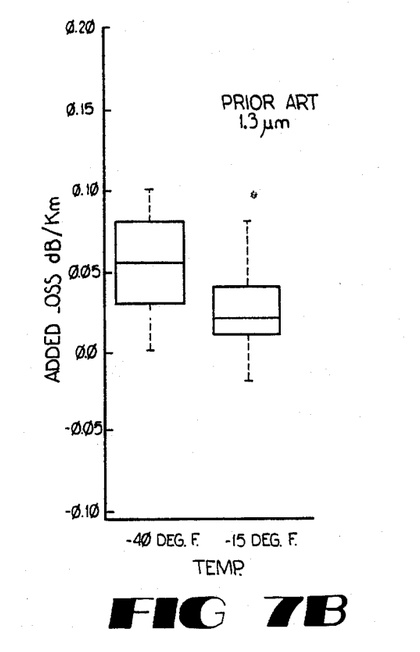

Referring now to FIGS. 6A and 7A, there are shown graphical representations of the added loss due to packaging in the optical fibers of the cable of this invention at two relatively low temperature levels and at two different operating wavelengths, 1.55 and 1.3 μm, respectively. In FIGS. 6B and 7B, there are shown graphical representations of the added loss at the temperatures shown and at operating wavelengths of 1.55 μm and 1.3 μm, respectively, in prior art cables which include optical fibers having the matched cladding refractive index profile shown in FIG. 4B. Each rectangular box represents the middle 50% of the sample with the horizontal line in each being the median. Broken lines extending vertically from each box represent the top and lower quartiles of the sample. As can be seen, at an operating wavelength of 1.3 μm, the median added loss for a cable including matched cladding optical fibers at −40° F. is 0.05 dB/km whereas for the cable of this invention, there is none. At an operating wavelength of 1.55 μm, the added loss of matched cladding fibers at −40° F. is about 0.15 dB/km greater than that for the cable of this invention.

Figure 8:
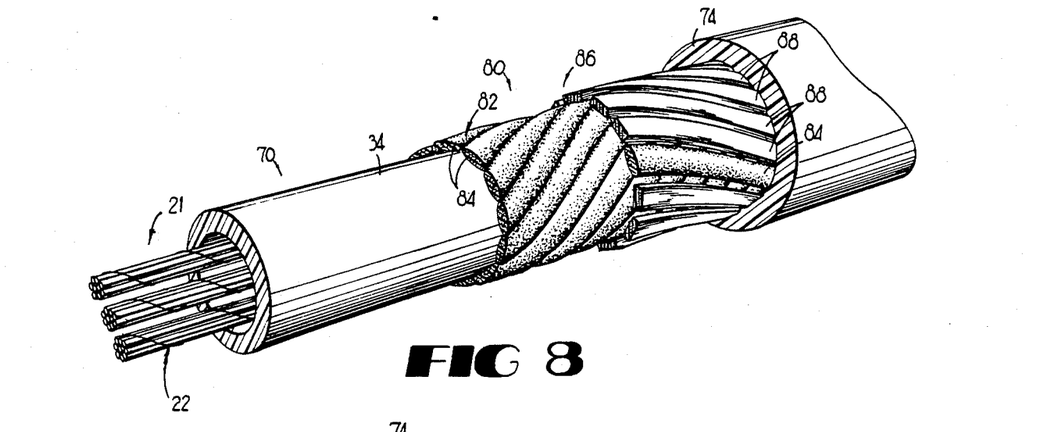
FIG. 8 is a perspective view of an alternative embodiment of a cable of this invention.

It should be clear that sheath systems other than that shown in FIGS. 1 and 2 may be used for cables of this invention. For the example, a cable 70 depicted in FIGS. 8 and 9 includes a core 21 and the tubular member 34. The tubular member 34 is enclosed by a plastic jacket 74. Interposed between the tubular member 34 and the jacket is a strength member system 80 which includes a layer 82 of strength members 84—84 and a layer 86 comprising a plurality of strength members 88—88 as well as several of the strength members 84—84. Each of the strength members 84—84 is a glass roving which has been impregnated with a polyurethane material, for example, whereas each of the strength members 88—88 is a glass yarn which has been impregnated with an epoxy material. The strength members 88—88 are capable of resisting compressive as well as tensile stresses.

It is to be understood that the above-described arrangements are simply illustrative of the invention. Other arrangements may be devised by those skilled in the art which will embody the principles of the invention and fall within the spirit and scope thereof.

What is claimed is:
1. An optical fiber cable, which comprises:
   a plurality of optical fibers which are assembled together without intended stranding to form a unit which extends in a direction substantially along a longitudinal axis of the cable, each of said optical fibers including a core, an outer cladding, and an inner cladding having an index of refraction which is less than that of the outer cladding and being characterized by a difference between the indices of refraction of said core and of said inner cladding which is sufficiently high to cause said each optical fiber to be substantially insensitive to microbending with the ratio of the inner cladding diameter to the core diameter, which ratio is sufficiently large to avoid affecting the dispersive properties of the optical fiber, and the ratio of the difference in the indices of refraction of the inner and the outer claddings to the difference in the indices of refraction between the core and the inner cladding being such that each said optical fiber is capable of operation in a single mode fashion at a predetermined wavelength;

a binder which is wrapped about said plurality of optical fibers;

a tube which is made of a plastic material and which encloses the plurality of optical fibers with the ratio of the cross-sectional area of the plurality of optical fibers to the cross-sectional area within the tube not exceeding a predetermined value, said tube being substantially parallel to the longitudinal axis of the cable;

a strength member system; and a jacket which is made of a plastic material and which encloses said tube.

2. The cable of claim 1, wherein each of the optical fibers is provided with a coating and wherein the ratio of the cross-sectional area of the plurality of coated optical fibers to the cross-sectional area within the tube does not exceed a value of about 0.5.

3. The cable of claim 1, wherein said tube which is disposed about a plurality of units is a common tube without any intermediate tubes separating said units from one another, each unit comprising a plurality of optical fibers and being wrapped with a binder.

4. The cable of claim 3, wherein the units are stranded together.

5. The optical fiber cable of claim 1, wherein the difference between the indices of refraction of the inner and outer claddings is in the range of about 10 to 40% of the difference between the indices of refraction of the core and the inner cladding, and wherein the ratio of the inner cladding diameter to the core diameter is not less than about 3.

6. An optical fiber cable, which comprises:

a plurality of units, each of the units comprising a plurality of optical fibers which are assembled together without intended stranding to form a unit which extends along the cable and a binder wrapped about the unit, each of said optical fibers including a core, an outer cladding and an inner cladding having an index of refraction which is less than that of said outer cladding and being characterized by a difference between the indices of refraction of said core and of said inner cladding which is sufficiently high to cause each fiber to be substantially insensitive to microbending with the ratio of the cladding diameter to the core diameter, which ratio is sufficiently large to avoid affecting dispersive properties of the optical fiber, and the ratio of the difference in the indices of refraction of the inner and outer claddings to the overall difference in indices of refraction between the core and the inner cladding being such that each said optical fiber is capable of operation in a single mode fashion at a predetermined wavelength;

a tube which is made of a plastic material and which encloses the plurality of units with the ratio of the cross-sectional area of the plurality of optical fibers to the cross-sectional area within the tube not exceeding a predetermined value, said tube being substantially parallel to the longitudinal axis of the cable;

a waterblocking material which is disposed within the tube and which fills substantially the interstices between the optical fibers of the units within the tube and between the units and the tube, the waterblocking material having a critical yield stress and a shear modulus which allow movement of the units within the tube when the waterblocking material is subjected to a predetermined stress;

a strength member system; and a jacket which encloses said tube and which is made of a plastic material.

7. The optical fiber cable of claim 6, wherein the waterblocking material has a critical yield stress which is not greater than about 70 Pa at 20° C. and a shear modulus less than about 13 KPa at 20° C.

8. The optical fiber cable of claim 7, wherein each of the units has a parallel lay.

9. The optical fiber cable of claim 7, wherein each of the units has a stranded lay.

10. The optical fiber cable of claim 6, wherein the difference between the indices of refraction of the inner and outer claddings is in the range of about 10–40% of the difference between the indices of refraction of the core and the inner cladding, and wherein the ratio of the inner cladding diameter to core diameter is not less than about 3.

11. The optical fiber cable of claim 10, wherein the tube is a common tube which encloses the plurality of units with the units being separated from one another only by the waterblocking material, wherein each of the optical fibers is provided with a coating, wherein the predetermined value is 0.5 and wherein the length of the tube is no greater than the length of any fiber in each unit.

12. The cable of claim 11, wherein the waterblocking material is a composition of matter which comprises:

(a) 77 to 95% by weight of an oil selected from the group consisting of:

i. paraffinic oil having a minimum specific gravity of about 0.86 and a pour point less than −4° C. and being of ASTM type 103, 104A or 104B;

ii. naphthenic oil having a minimum specific gravity of about 0.86 and a pour point less that −4° C. and being of ASTM type 103, 104A or 104B;

iii. polybutene oil having a minimum specific gravity of about 0.83 and a pour point less than 18° C.; and iv. any mixture thereof; and (b) 2 to 15% by weight of hydrophobic fumed silica colloidal particles.

13. The cable of claim 11, wherein the waterblocking material is a composition of matter comprising:

(a) 77 to 95% by weight of an oil selected from the group consisting of:

i. paraffinic oil having a minimum specific gravity of about 0.86 and a pour point of less than −4° C and being of ASTM type 103, 104 A or 104B;

ii. naphthenic oil having a minimum specific gravity of about 0.86 and a pour point less that −4° C. and being of ASTM type 103, 104A or 104B;

iii. polybutene oil having a minimum specific gravity of about 0.83 and a pour point of less than 18° C.;

iv. triglyceride-based vegetable oil;
v. polypropylene oil;
vi. chlorinated paraffin oil having a chlorine content between about 30 and 75% by weight and a viscosity at 25° C. of between 100 and 10,000 cps;
vii. polymerized esters, and
viii. any mixture thereof; and (b) 2 to 15% by weight colloidal particles selected from the group consisting of hydrophobic fused silica, hydrophilic fused silica, precipitated silica, and clay, the colloidal particles having a BET surface area in the range from about 50 to about 400 m$^2$/g.

14. The cable of claim 13, wherein the composition of matter further comprises up to 15% by weight of a bleed inhibitor selected from the group consisting of styrene-rubber and styrene-rubber-styrene block copolymers having a styrene/rubber ratio between about 0.1 and 0.8, semiliquid rubber having a Flory molecular weight between 20,000 and 70,000, butyl rubber, ethylene-propylene rubber, ethylene-propylene dimer rubber, chlorinated butyl rubber having a Mooney viscosity at 100° C. between about 20 and 90, and depolymerized rubber having a viscosity at 38° C. between 40,000 and 400,000 cps, and wherein the oil, the colloidal particles, and the bleed inhibitor comprise at least 99% by weight of the composition of matter.

15. The cable of claim 14, wherein said composition comprises about 90 to 95% b.w. of oil and about 2 to 10% b.w. of colloidal particles.

16. An optical fiber cable, which comprises:
a plurality of optical fibers which extend in a direction substantially along a longitudinal axis of the cable, each of said optical fibers including a core, an outer cladding, and an inner cladding having an index of refraction which is less than that of the outer cladding and being characterized by a difference between the indices of refraction of said core and of said inner cladding which is sufficiently high to cause said each optical fiber to be substantially insensitive to microbending with the ratio of the inner cladding diameter to the core diameter, which ratio is sufficiently large to avoid affecting the dispersive properties of the optical fiber, and the ratio of the difference in the indices of refraction between the core and claddings to the difference in the indices of refraction between the core and the inner cladding being such that each said optical fiber is capable of operation in a single mode fashion at a predetermined wavelength;
a tube which is made of a plastic material and which encloses the plurality of optical fibers with the ratio of the cross-sectional area of the plurality of optical fibers to the cross-sectional area within the tube not exceeding a predetermined value, said tube being substantially parallel to the longitudinal axis of the cable;
a strength member system; and
a jacket which is made of a plastic material and which encloses said tube.

* * * * *